United States Patent
Vidal

[15] 3,646,663
[45] Mar. 7, 1972

[54] A PROCESS FOR THE MANUFACTURE OF BOX-TYPE TUBULAR STRUCTURAL MEMBERS HAVING SELECTIVELY DIFFERENT CROSS-SECTIONAL DIMENSIONS

[72] Inventor: Javier Sario Vidal, Santa Engracia 2, Pamplona (Navarra), Spain

[22] Filed: Jan. 12, 1970

[21] Appl. No.: 2,187

[30] Foreign Application Priority Data

Jan. 7, 1970 Spain .................................. 375,233

[52] U.S. Cl. .............................. 29/463, 29/471.1, 29/480, 29/481, 29/493
[51] Int. Cl. ........................................................ B21d 39/02
[58] Field of Search ............... 228/4, 6, 44, 47, 49; 29/429, 29/463, 471.1, 475, 480–481, 488, 493

[56] References Cited

UNITED STATES PATENTS

| | | | |
|---|---|---|---|
| 1,831,343 | 11/1931 | Caldwell | 228/47 |
| 2,526,723 | 10/1950 | Berkeley | 228/49 X |
| 3,182,880 | 5/1965 | Hildenbrand | 228/6 |
| 3,236,617 | 2/1966 | Jamnik et al. | 228/49 X |

*Primary Examiner*—John F. Campbell
*Assistant Examiner*—Richard Bernard Lazarus
*Attorney*—Wenderoth, Lind and Ponack

[57] ABSTRACT

A process and related system for readily and economically manufacturing structural tubes such as box girders of a variety of different sizes, even in relatively small production amounts, and which process and system comprise transporting and placing of elongated channellike members or profiles so that every consecutive two members are placed in an open face-to-face and oppositely inclined manner, whereby the opposed members are then collectively fed into one or more welding stations where the abutting edges of the flange portions are welded together. Apparatus is used for pulling or driving the welded members into a weld finishing station and also to apparatus for substantially simultaneously effecting straightening of the welded together members which may tend to distort while being subjected to welding. The apparatus is readily adjustable to handle variable size channel members in the selective manufacturing of tubular structural members having varied cross-sectional sizes.

2 Claims, 11 Drawing Figures

Javier VIDAL SARIO, Inventor

A PROCESS FOR THE MANUFACTURE OF BOX-TYPE TUBULAR STRUCTURAL MEMBERS HAVING SELECTIVELY DIFFERENT CROSS-SECTIONAL DIMENSIONS

At the present time large tubes of square or rectangular section, utilizable as structural elements of great resistance, are obtained by means of various known processes.

One of these known processes consists in starting with two open U-shaped profiles or channellike members, which are then juxtaposed by the edges of their free flanges and are joined together by manually welding the said edges until a closed boxlike girder section is obtained. It will be immediately appreciated that this system is very slow, and offers no security, since the mechanical strength of the finished product depends to a great extent on the operatives who make the welds.

Another process, which is technically much more perfect, consists in the formation of the tube from a flat band of steel which is cold-shaped and is welded at the free edges. However, this process has the disadvantage of requiring a very expensive installation consisting in large machines the maintenance of which presents difficulties.

A third process is that of extrusion, but its cost is prohibitive, especially when it is a question of obtaining small series of tubes of different dimensions.

In view of what has been expounded, it will be observed that the ideal process would start with open profiles, which would be welded to constitute the tube by means of an automatic installation in which the welds would be made in a regular manner without the greater or lesser skill of the operative being an important factor.

Installations of this type are also known at the present time, but they lack sufficient versatility.

In fact these installations are intended for the manufacture of relatively large members of tubes, and thus they are antieconomic for the manufacture of small series of tubes of different dimensions, especially if these dimensions are relatively large.

In effect, the known installations of this type are generally linked with rolling mills in which, starting with a flat sheet or band, the profile is cold rolled. Since it is these rolling mills that directly feed the welding plant, any alteration that it is endeavoured to produce with regard to the size of the finished tube implies a previous adjustment to the rolling mill, which gives rise to considerable losses of time, especially if it is a question of producing relatively short runs.

These installations cannot be fed on the basis of profiles that have been previously shaped, obviating the rolling mill, since the sliding or movement of the profiles through the plant so that they may be welded is effected by the thrust of the rolling mill itself.

The subject of the present invention is a process which, starting with open profiles which are situated with their open sides facing one another and are then automatically welded, achieves the manufacture of tubes of dimensions of from 120×120×to 400×400×8, in short runs of 20 to 25 metric tons.

Consequently, the process in question starts with profiles that have already been manufactured, which, by means of suitable devices, are duly lined up, situated face-to-face, welded and transported.

In order that the characteristics of the process proposed may be better understood, the present specification is accompanied by a set of drawings in which the different figures represent that which is detailed below:

Figure 1:
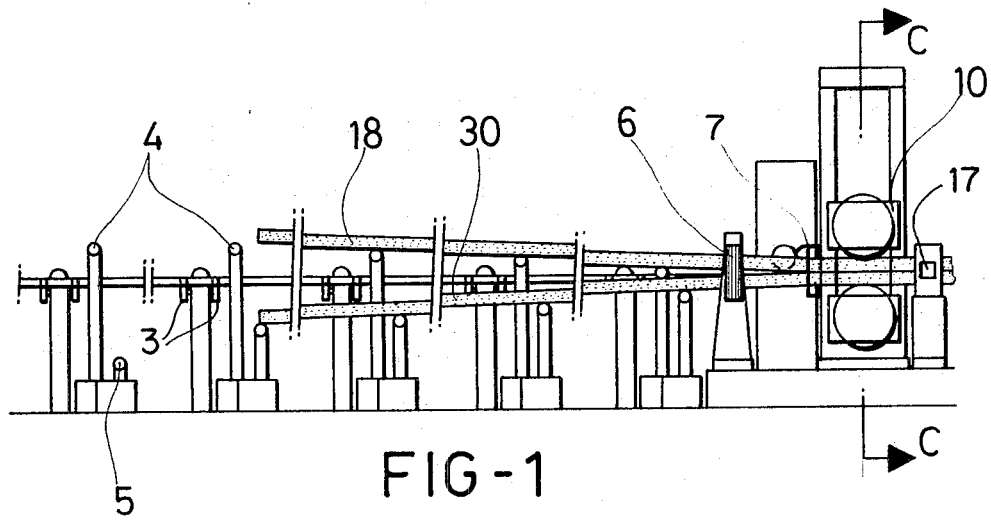
FIGS. 1 and 2 are elevation and plan views, respectively, of the first section of the plant in which the process is carried out.
Figure 2:
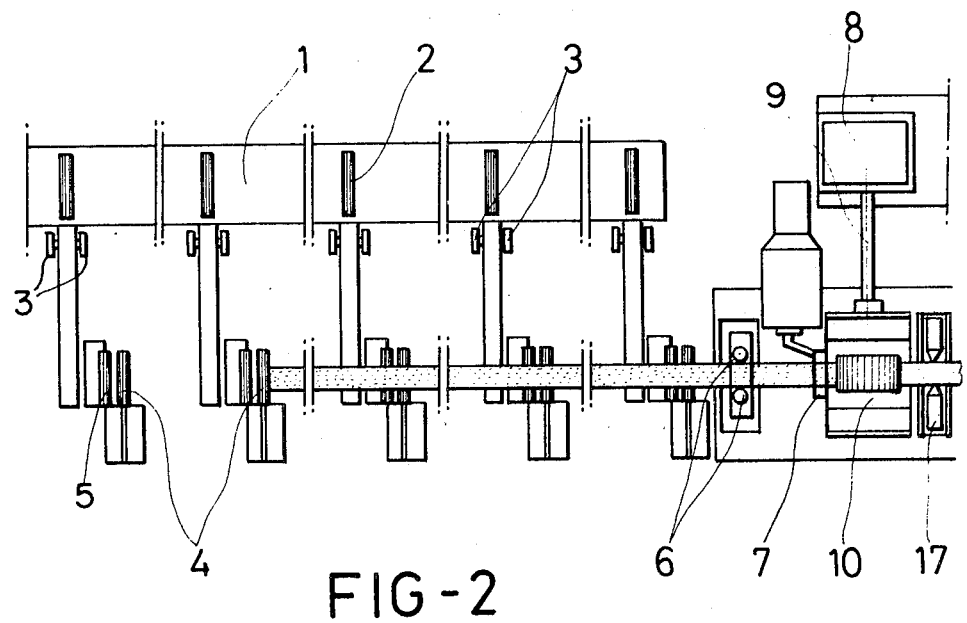

The first section of FIGS. 1 and 2 includes the following elements:

a. A loading table 1, equipped with a line of rollers 2 which facilitate the sliding movement of a succession of channellike members or profiles of U-shaped cross section, which members are placed on the said table with their open sides facing upwards.

b. A turning device 3 which acts on each of the profiles deposited on the table, operating in the following manner:

The device transports the first profile member in a direction parallel to itself until it deposits it in a loading device which transports it to the welding machine.

The device transports the next following profile member, also in a direction parallel to itself, to the loading device, and simultaneously turns the profile through 180° until it is facing the previously loaded profile member.

This operation is continuously repeated.

c. Positioning devices, constituted by a number of rollers, free-running or motor-driven 4 and 5, which are divided into two groups, of which the group of rollers 5 are endowed with an ability to move them in a consecutively descending order away from the welding apparatus and to receive the profiles 30 situated with their opening facing upwards, while the other rollers 4 have an ability to be moved into an ascending order away from the welding apparatus and are designed to receive the profiles 18 which have been situated with their open sides facing downwards.

The said groups of rollers 4 and 5 can be selectively adjusted in such a way that the profiles 18 and 30 supported on them are positioned in directions converging towards the welding apparatus after receiving the profiles from the loading table.

Figure 3:
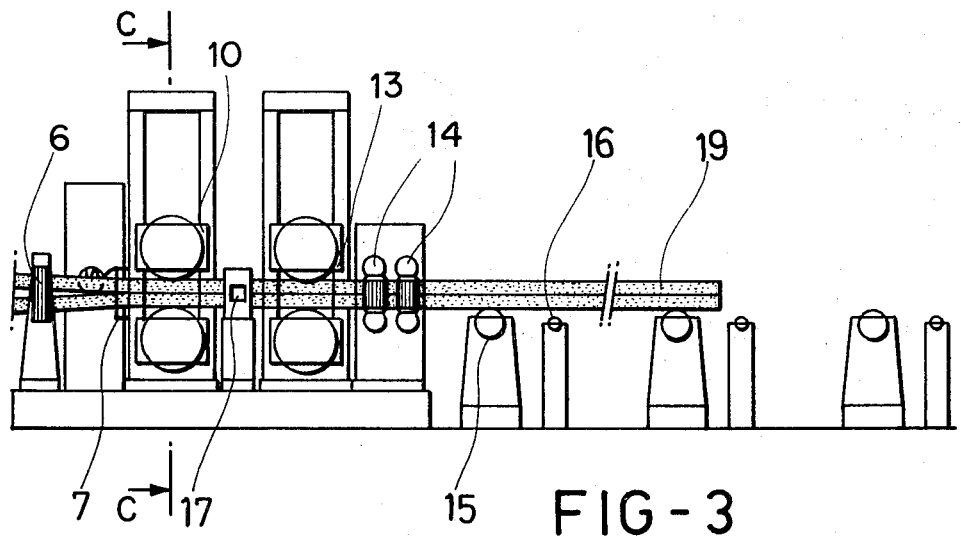
FIGS. 3 and 4 are elevation and plan views, respectively, of the second section of the installation showing again some of the same elements already shown in FIGS. 1 and 2, to better illustrate the continuity between the reactions.
Figure 4:
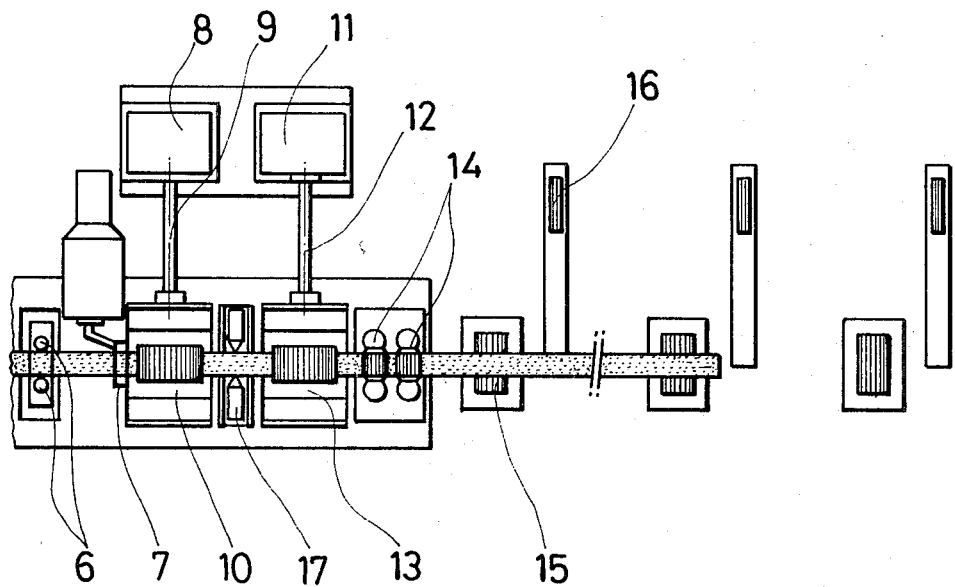

FIGS. 3 and 4 represent the elevation and plans views, respectively, of the second section of the installation, wherein some of the elements have been already shown jointly in the first section in FIGS. 1 and 2, with the aim of facilitating the understanding of the continuity existing between both sections.

The said second section is constituted by the following elements:

a. A guiding device, constituted by two rollers 6 whose shafts are disposed vertical and parallel, and which rollers serve to transport or convey the profiles without permitting any deviation of the profiles which have been pre-disposed face to face and in a convergent position, leading towards the welding apparatus.

b. A conventional apparatus 7 for welding without the contribution of material, embodies means to enable it to be adjusted with respect to its capacity to adapt itself to different sizes of profiles.

c. An apparatus 10 is driven by a motor element 8 by means of suitable transmissions 9, which apparatus makes the welds and draws the tube being formed, the characteristics of which apparatus are detailed hereinafter.

d. A device 17 for finishing the welds, which device can be constituted by cutting tools, is such that it may either be fixed or motor-driven.

e. Another apparatus 13 for making welds and drawing the tubes, driven by means of an independent motor element 11 and the appropriate transmission elements 12, and which cooperates in the drawing effect of the previous apparatus.

f. A straightening head or so-called Turk's head 14 the function of which is to correct any distortion occuring in the tube 19 that has been formed.

g. A conventional system for withdrawing the tubes, constituted by two parallel lines of rollers 15 and 16, by means of which the tubes are withdrawn from the apparatus referred to above and are transported to a machine where they are cut into fixed lengths.

Figure 5:
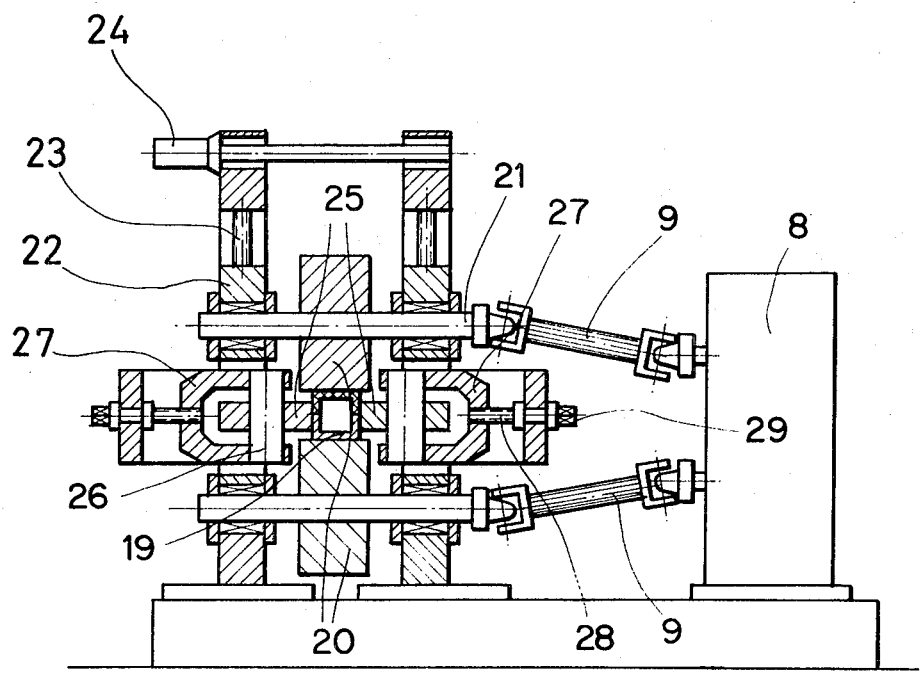
FIG. 5 is a diagrammatic cross-sectional view taken substantially on line C-C of FIG. 1.

Proceeding to FIG. 5, representing the diagrammatic cross section of the first of the apparatuses for welding and drawing the tubes, which view is taken through the line C-C of FIG. 1 indicated in the overall elevation view, in this section it may be seen that the apparatus consists of two rollers 20 whose shafts are disposed horizontally, to which rotative movement is imparted by the motor 8 by means of the appropriate transmission elements 9, and which rollers 20 are arranged in combination with two other rollers 25 whose shafts 26 are vertically disposed.

It may likewise be seen that while the shafts 26 of the rollers 25 are fitted on supports 27 which can be caused to recede from one another or to approach one another through the action of spindles 28 linked to the supports and equipped with a driving head 29, the shaft 21 of the upper roller of the other pair is fitted on supports 22 which can be raised or lowered through the action of other spindles 23 driven by an automatic device 24.

Figure 6:
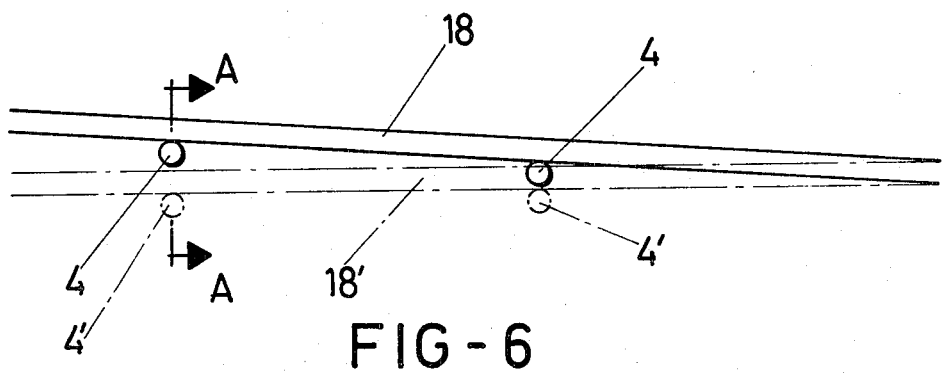
FIGS. 6 and 7 are fragmentary diagrammatic views showing some of the respective loading rollers in their respective initial positions and in their subsequently loading positions.
Figure 7:
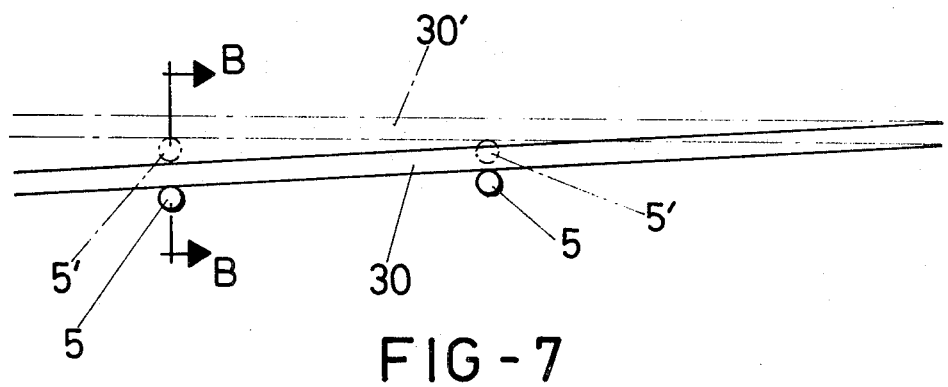

FIGS. 6 and 7 show diagrams of the operation of each of the groups of rollers that constitute the loading device, there being indicated by the numbers 4' and 5' the respective initial positions in which they receive the profiles, and by the numbers 4 and 5 the respective positions in which they are placed for loading. The profiles are indicated by the numbers 18' and 30' in the initial position, and by 18 and 30 in the loading position.

Figure 7A:
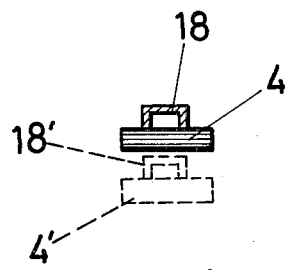
FIGS. 7A and 7B are respective transverse cross sections taken on lines A-A and B-B of the FIGS. 6 and 7, respectively.
Figure 7B:
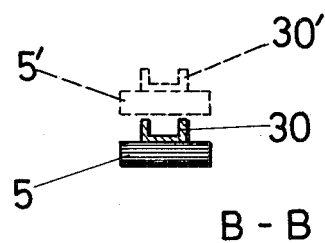

For the sake of greater clarity, a cross section of each figure is shown, given in FIGS. 7A and 7B as viewed on the lines A-A and B-B respectively, of FIGS. 6 and 7 which will enable the operations explained to be better understood.

Figure 8:
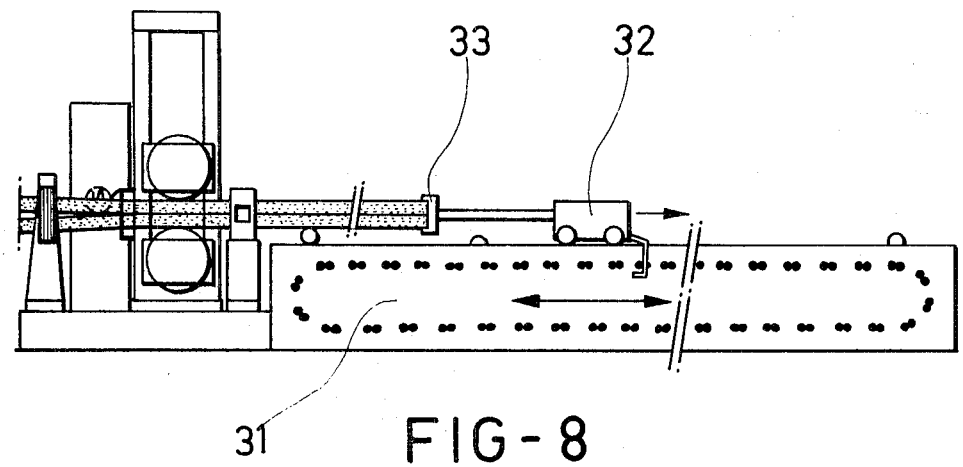
FIGS. 8 and 9 represent elevation and plan views, respectively, of a modification or variation of the second section of the installation.
Figure 9:
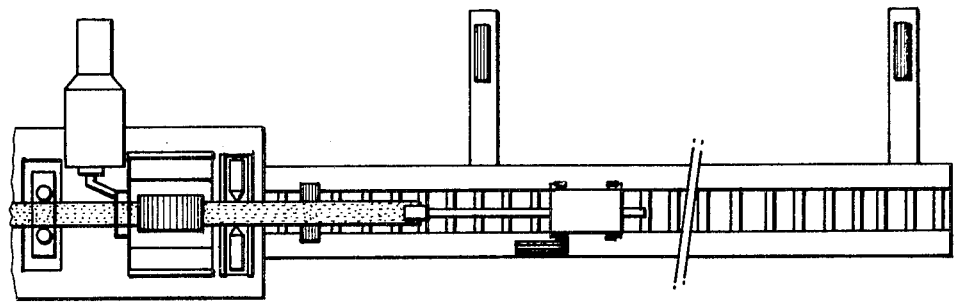

Lastly, FIGS. 8 and 9 represent a variant of the subject invention, in accordance with which the second section of the installation has been modified, without this implying any change in the essence of the idea described.

In accordance with this variant, as may be seen from the drawing, the pulling of the tube, which was previously affected by means of the combined action of two groups or apparatuses 10 and 13 for making the welds and drawing the tubes, is effected by means of a conventional drawbench 31, whose movable carriage 32 is fitted with a special grip 33 to engage in the head of the tube.

This eliminates one of the welding-drawing groups, represented by the device 13, and converts the other into a simple welding group, since it is unnecessary to equip it with a driving system; and it also eliminates the straightening head, the use of which also becomes unnecessary in view of the tension to which the drawbench subjects the tube.

It is apparent that an improved system and process have been evolved for the manufacture of structural tubular members by welding opposed channellike members in their face-to-face condition, for which reference to the appended claims is to be had for a definition of the scope of the invention.

I claim:

1. An improved process for the manufacture of generally box-type tubular structural members from a plurality of longitudinally elongated sections of generally channellike flanged members fed in series and subsequently welded together in pairs at at least one welding station in face-to-face relation along their abutting flanges, comprising the steps of:
   a. receiving on conveying means from an uninterrupted supply a series of flanged channellike members of uniform length and cross-sectional size in a continuous aligned series with their flanges and open sides facing upwardly;
   b. placing every two consecutive members in convergingly superposed face-to-face relation so as to converge together at said welding station in a common plane;
   c. mechanically feeding said two members from their respective convergingly inclined positions toward said welding station while guiding and maintaining said members in a common vertical plane, while gradually reducing the relative inclination of said members;
   d. welding said superposed members together in the areas along their abutting longitudinal edges as they gradually reduce their relative inclination and are brought into adjacently parallel superposed abutting relation;
   e. forging and subsequently dressing off said welds; and
   f. applying straightening pressure to said welded-together members upon leaving the welding station to correct and straighten any distortions which may tend to evolve in the box-type tubular member as a result of being subjected to the welding.

2. An improved process as defined in claim 1 wherein the step of paragraph (b) providing for the placing of every two consecutive members in a convergingly superposed face-to-face relation so as to converge together at said welding station further includes:
   1. placing the first of every two consecutive members in the same face up and generally horizontal condition as received from the supply but onto a corresponding first set of adjustable support means;
   2. adjusting said first support means so that said first member is displaced into an inclined plane below and relative to the initial horizontal condition, while inclined relative to the welding station;
   3. subsequently rotating the second of every two members through 180° and thus placing it in a facedown condition upon a second support means and in a correspondingly vertically aligned manner with said first member; and
   4. then adjusting said second support members so that said second member is displaced into an inclined plane corresponding to that of said first member but in an opposite direction thereto, above and relative to the initial horizontal condition, while inclined relative to said welding station.

* * * * *

UNITED STATES PATENT OFFICE
CERTIFICATE OF CORRECTION

Patent No. 3,646,663        Dated March 7, 1972

Inventor(s) Javier VIDAL SARIO

It is certified that error appears in the above-identified patent and that said Letters Patent are hereby corrected as shown below:

The inventor's correct name is Javier VIDAL SARIO.

Column 1, line 57 should read 120x120x4 to 400x400x8...

Signed and sealed this 6th day of June 1972.

(SEAL)
Attest:

EDWARD M. FLETCHER, JR.    ROBERT GOTTSCHALK
Attesting Officer    Commissioner of Patents